Figure 1:
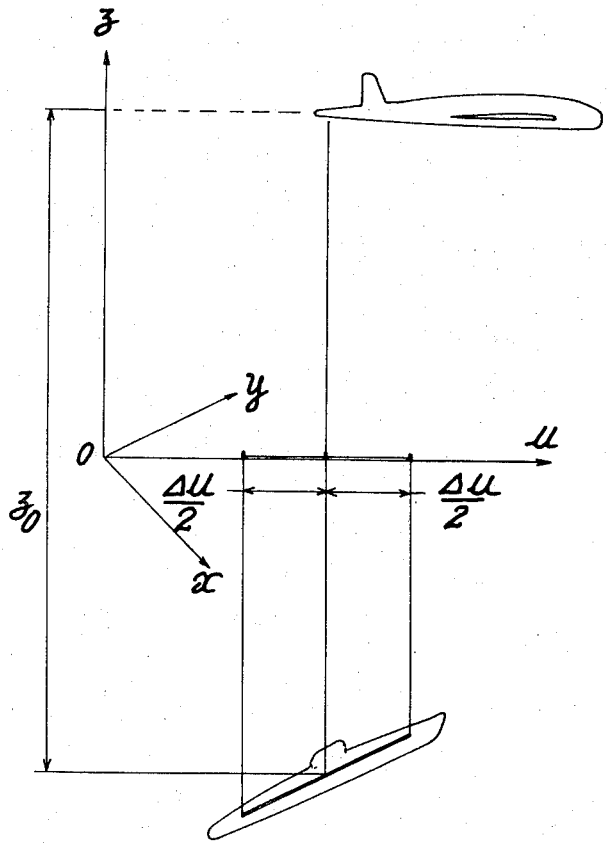

United States Patent [19]
Lemercier et al.

[11] 3,808,519
[45] Apr. 30, 1974

[54] METHOD AND DEVICE FOR DETERMINING THE DEPTH OF A MAGNETIC ANOMALY

[75] Inventors: Danièle Lemercier, St. Martin Le Vinoux; Antoine Salvi, Fontaine, both of France

[73] Assignee: Commissariat A L'Energie Atomique, Paris, France

[22] Filed: June 13, 1972

[21] Appl. No.: 262,187

[52] U.S. Cl............................. 324/3, 324/4, 324/8, 324/43 R
[51] Int. Cl. ......................... G01v 3/08, G01v 3/16
[58] Field of Search............ 324/.5 E, 3, 4, 8, 43 R

[56] References Cited
UNITED STATES PATENTS

| | | | |
|---|---|---|---|
| 3,263,161 | 7/1966 | Ruddock et al. ...................... | 324/8 |
| 3,441,841 | 4/1969 | Salvi et al. ........................ | 324/43 R |
| 3,490,032 | 1/1970 | Zurflueh ............................ | 324/8 |
| 3,639,828 | 2/1972 | Salvi ................................. | 324/8 X |

Primary Examiner—Gerard R. Strecker

[57] ABSTRACT

This invention is concerned with a method and a device for determining the depth of a magnetic anomaly at least approximately comparable with a horizontal dipole. A particular use of the invention includes the search for and identification of submarines by reconnaissance aircraft carrying a high-precision magnetometer.

According to the invention the variation in the perturbation H to the magnetic field caused by the anomaly and the variation in the gradient $\delta H/\delta u$ along a horizontal path perpendicular to a main direction of the dipole are determined. The depth $z_0$ of the anomaly is deduced from the formula:

$$z_0 = 3 \cdot m \ H\text{max}/(\delta H/\delta u) \text{ max}.$$

where $m$ is equal to 1/3.5 if the path is perpendicular to the dipole and is equal to 1 if the path is parallel thereto.

10 Claims, 9 Drawing Figures

METHOD AND DEVICE FOR DETERMINING THE DEPTH OF A MAGNETIC ANOMALY

The invention relates to a method and device for determining the depth of a magnetic anomaly at least approximately comparable with a horizontal dipole, which may or may not be associated with a vertical dipole. The invention may be used for identifying the nature of a magnetic anomaly detected below the free surface of water by a magnetometer moving above the water level. Such applications of the invention include the search for and identification of submarines by a reconnaissance aircraft carrying a high-precision magnetometer. Any magnetic anomalies at a greater depth than the water will be of geomagnetic origin.

There are known methods of determining the depth of a magnetic anomaly of any origin by analysing the perturbation which it makes in the earth's magnetic field, the perturbation being recorded by a magnetometer measuring assembly moving above the anomaly. In the known methods, however, it is simultaneously necessary to measure the absolute field and the vertical gradient when the aircraft is at a height sufficient not to be affected by the vertical gradient. In practice, it is necessary to use two magnetometers mounted in "birds" towed slowly by a helicopter. This method is unsuitable for the reconnaissance aircraft. The two "birds" also have to be exactly maintained on a single vertical line during the measurement, a condition which is difficult to satisfy.

The invention relates to a method and device for determining the depth of a magnetic anomaly so as to meet practical requirements better than prior art methods and devices, for example by obviating the aforementioned disadvantages by not being dependent on the measurement of the vertical gradient.

According to the invention there is provided a method of determining the depth $z_0$ below a device for measuring the total magnetic field, of a magnetic anomaly at least approximately comparable with a horizontal dipole, characterised in that the variation in the perturbation H to the magnetic field caused by the anomaly and the variation in the gradient $\delta H/\delta u$ along a horizontal path perpendicular to a main direction of the dipole are determined, and the depth $z_0$ is deduced from the formula:

$$z_0 = 3.m\ H_{max}/(\delta H/\delta u)\ max.$$

wherein $H_{max}$ denotes the maximum value of the perturbation H in the field and $(\delta H/\delta u)$ max denotes the maximum value of the gradient on the path followed, and wherein $m$ is equal to $1/3.5$ if the path is perpendicular to the dipole and is equal to 1 if the path is parallel thereto.

It might be thought that it was merely necessary to measure the value of H and of $\delta H/\delta u$ at each instant and to store the maximum value. This method, however, is inconvenient in practice since, if the magnetometer is carried by an aircraft, the gradient of the field measured near and along the trajectory of the aircraft is mainly due to the aircraft in the neighbourhood of the latter. Consequently, it is much preferable to store the successive values of the field recorded at regular time intervals (corresponding to equal distances if the aircraft is flying at a constant speed) and to compare $\delta H/\delta u$ with $\Delta H/\Delta u$ ($\Delta H$ being the difference between the values measured at two points separated by a distance $\Delta u$).

The invention also provides a device for determining the depth $z_0$ in order to work the aforementioned method. The device according to the invention for determining the depth $z_0$ of a magnetic anomaly approximately comparable with a horizontal dipole, is characterised in that it comprises, on a carrier vehicle adapted to fly at a constant altitude, means for measuring the variations in the total earth's magnetic field, filter means for showing the variation in the field due to the perturbation caused by the anomaly, means for measuring the gradient $\delta H/\delta u$ along the path followed by the vehicle, means associated with the preceding means for recording the maximum values $H_{max}$ and $(\delta H/\delta u)$ max for calculating the depth from the formula:

$$z_0 = 3m\ H_{max}/(\delta H/\delta u)_{max}$$

and means for giving $m$ the value $1/3.5$ when the path of the aircraft is perpendicular to the main direction of the dipole, and 1 when the path of the aircraft is parallel to the aforementioned direction.

Figure 6:
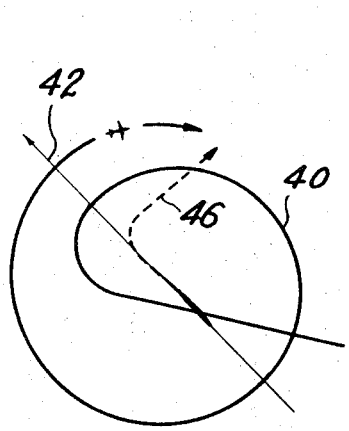
Figure 7:
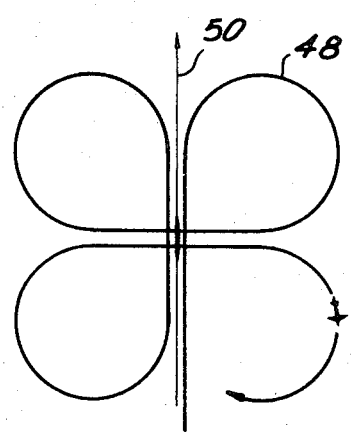
Figure 2:
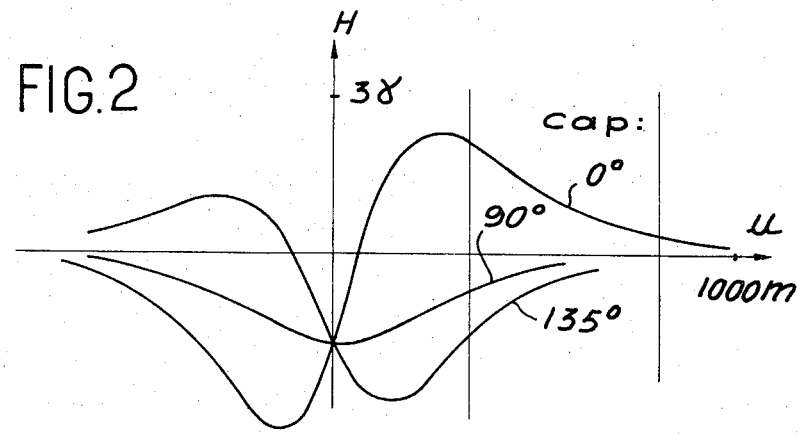
Figure 3:
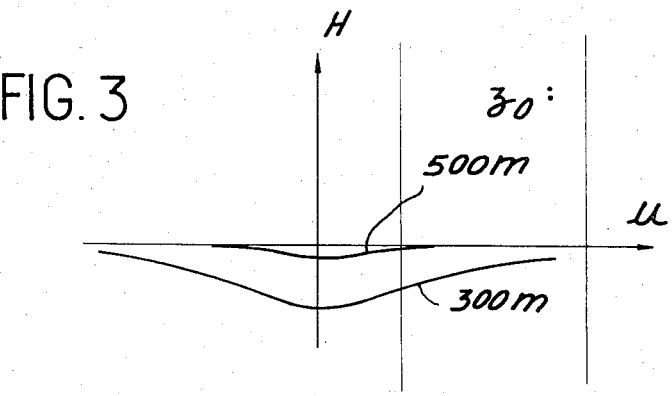
Figure 4:
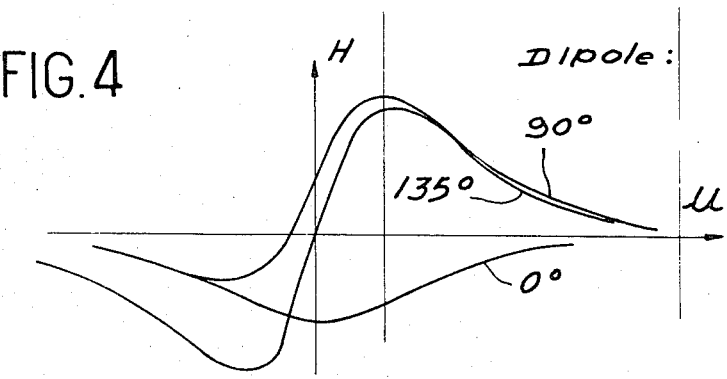
Figure 5:
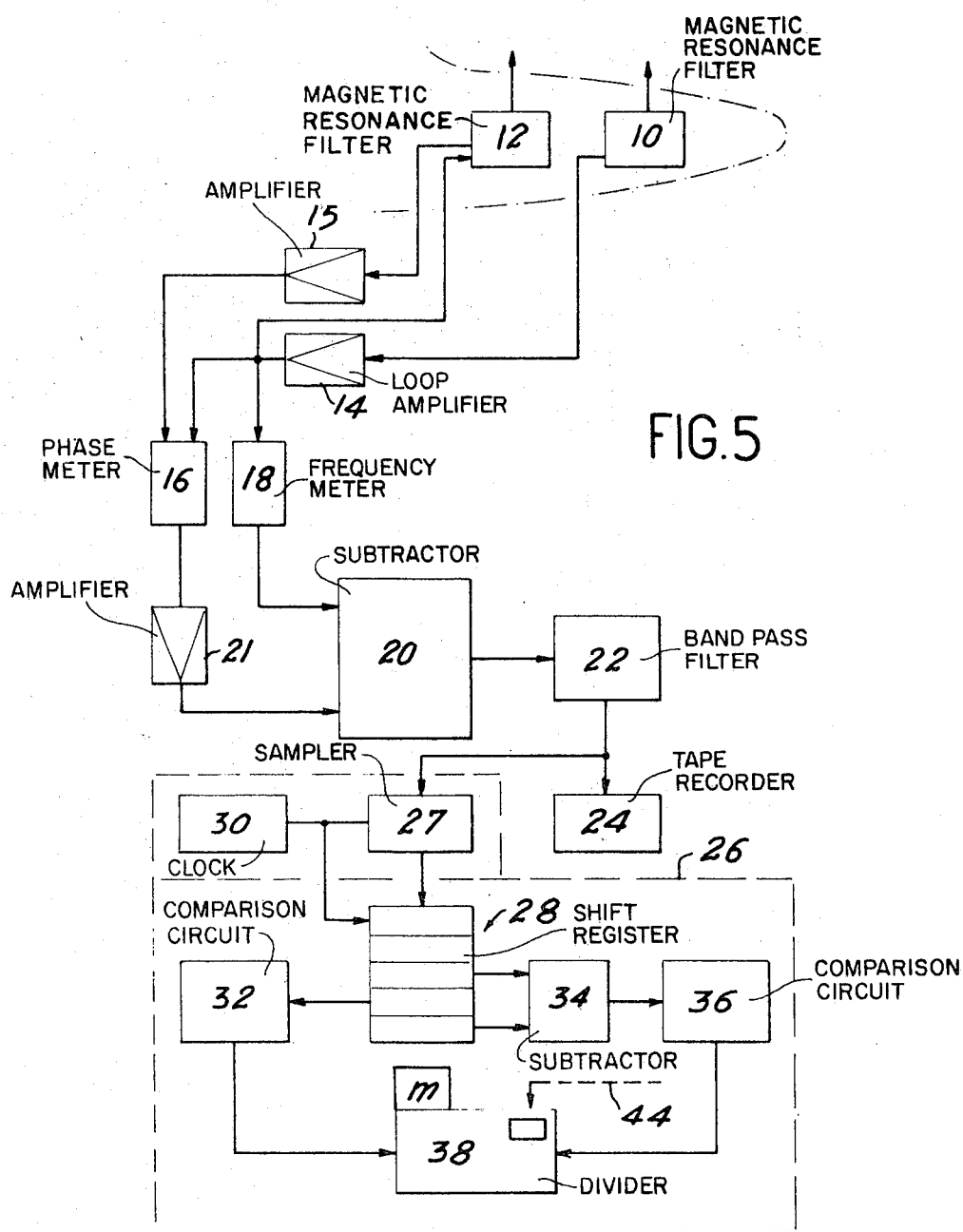
Figure 8:
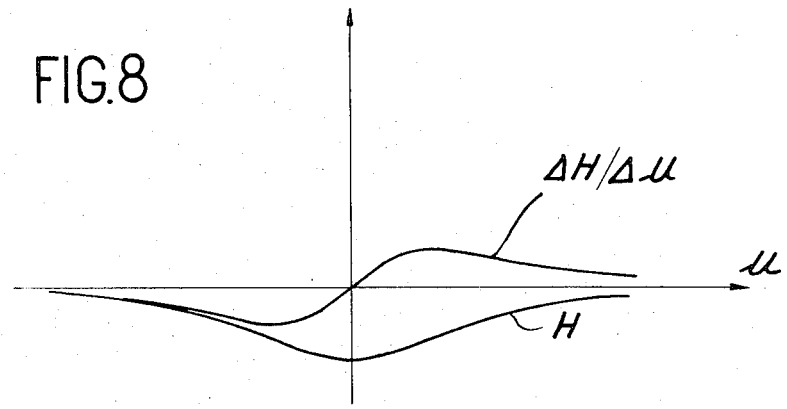
Figure 9:
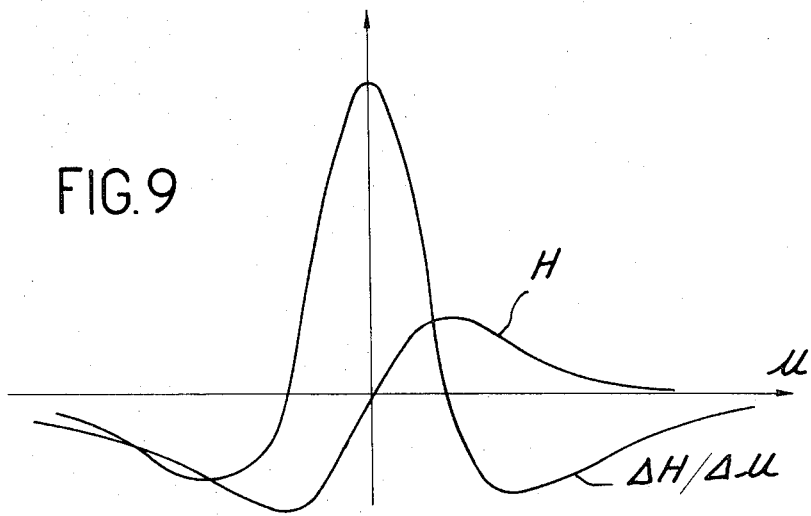

The invention will be more clearly understood from the following description of a method and device for determining the depth of a magnetic anomaly such as a submarine, using a magnetometer assembly mounted on a reconnaissance aircraft. The description refers to the accompanying drawings in which:

FIG. 1 is a schematic diagram showing the system of axes used for expounding the theory required for understanding the invention, FIG. 2 shows the theoretical variation in the field recorded along the path of the reconnaissance aircraft bearing the magnetic assembly in various directions above a horizontal dipole oriented in the north-south direction (the curves have been freed from the background noise which always contaminates them in practice), FIG. 3 shows the theoretical variation in the field recorded when the aircraft travels at 135 magnetic degrees and at different altitudes above a dipole oriented at 45°;

FIG. 4 shows the theoretical variation in the field recorded when the aircraft travels at 90 magnetic degrees (i.e., towards the east) above dipoles oriented in various directions (0°, 45°, 90°), FIG. 5 shows a magnetometer assembly comprising a self-compensating absolute magnetometer for use according to the invention, FIGS. 6 and 7 very diagrammatically show trajectories for identifying submerged anomalies, the trajectories being called "hunting circles" and "four-leaved clover" respectively, and FIGS. 8 and 9 show the general appearance of the variation in the total field and of the gradient of the field along the trajectory of an aircraft flying perpendicular to a horizontal dipole (FIG. 8) and parallel to a horizontal east-west dipole (FIG. 9).

The perturbation H to the earth's magnetic field by a submerged or underground magnetic anomaly is given by the formula:

$$H = Kr^{-n}$$

In this formula, r is the distance between the perturbation and the centre of the anomaly, K is a constant and n is the rate of decrease.

A submerged submarine may be compared with a horizontal dipole associated with a vertical dipole which has a much lower moment and the effect of which may be neglected compared with the effect of the first dipole beyond a distance of the order of 100 m. Consequently, in formula (2) $n$ is equal to 3 and, in the system of axes shown in FIG. 1 (where $Oz$ is vertical), we can write:

$$x_0 \delta H/\delta x + Y_0 \delta H/\delta Y + z_0 \delta H/\delta z = -3H \quad (3)$$

In this formula, $x_0$, $Y_0$, $z_0$ are the coordinates with respect to the anomaly of the point where the perturbation is measured, and H is the amplitude of the perturbation.

Equation (3) can easily be integrated by measuring $z_0$ and $\delta H/\delta z$ when the aircraft passes vertically over the anomaly, since $\delta H/\delta z$ may with good approximation be compared with $\Delta H/\Delta z$ ($\Delta H$ being the variation in the field over a height $\Delta z$), provided that $\Delta Z$ is appreciably lower than $z_0$. We have seen, however, that measurement of the vertical gradient results in unacceptable limitations in many cases.

The integration of equation (3), which has partial derivatives, gives a complex solution in the general case, but is simplified in particular cases which will now be considered, so that $z_0$ can be determined merely by measuring H and $\delta H/\delta u$ (the gradient along a horizontal path).

If the trajectory along which the field is measured (the Ou axis on FIG. 1) is perpendicular to the main direction of the horizontal dipole forming the magnetic anomaly, the curve showing the variation with distance of the field is even. This is the case with the curve in FIG. 2, which shows the variation in the perturbation when the aircraft flies at 90 magnetic degrees above a north-south dipole; the same applies to the curves in FIG. 3 (dipole at 45°, flight at 135 magnetic degrees).

The latter case can easily be checked, since it corresponds to an even field reaction curve, and calculations show that, in such cases, the depth $z_0$ of the anomaly below the place where the perturbation is measured is related as follows to the perturbation H and the partial derivative thereof along the trajectory followed by the magnetometer:

$$z_0 = 3 H \max/3.5 \, (\delta H/\delta u) \max \quad (1)$$

When the trajectory along which the field is measured is not perpendicular to the main direction of the horizontal dipole, the curve showing the variation of the field with distance comprises uneven terms. FIG. 2 shows that the uneven terms very rapidly become preponderant as soon as the direction differs from 90°, since there is a great similarity between curves showing the variation in the perturbation measured when flying at 135° and 0° over a north-south dipole. FIG. 4 also shows that the preponderance occurs very quickly when a dipole above which an aircraft flies at 90 magnetic degrees has an orientation which differs from the north-south axis. FIG. 4 also shows that only the uneven terms remain (i.e., the curve showing the variation in H is uneven) when the dipole is oriented east-west and when variations in the perturbation H parallel to the dipole are being measured.

When the direction in which the field is measured is parallel to the dipole, equation (3) with partial derivatives can be integrated to obtain the following relation:

$$z_0 = 3 H \max/(\delta H/\delta u) \max \quad (4)$$

It can be seen, in short, that the calculation of the depth is based on the fact that, as shown diagrammatically in FIG. 3, an increase in $z_0$ is shown mainly by an appreciable increase in the maximum signal amplitude and by a marked spread in the variation curve. When the path followed by the measuring magnetometer does not pass over the centre of the dipole, the changes in the curve showing the variation in the perturbation are mainly movements in translation along the Ou axis, without substantial changes in the shape and consequently without the introduction of appreciable errors.

In practice, the upper limit of the measuring range is at approx. $z_0 = 500 \, m$ (the most flattened curve in FIG. 3). The lower limit is at approx. $z_0 = 100 \, m$, but for a value as low as this the effect of the vertical dipole cannot easily be neglected, particularly when the horizontal dipole is in the east-west direction and causes theoretically zero perturbation when the detecting magnetometer is disposed at right angles to the dipole. The most frequent case is shown in in FIG. 2 by the curve corresponding to $z_0 = 300 \, m$ (search for submarines at a depth between $-250$ and $-200 \, m$, using an aeroplane flying between $+50 \, m$ and $+100 \, m$).

In order to work the invention and apply equations (1) and (4), it is necessary to know the variations in the perturbation H to the earth's magnetic field along particular horizontal paths, and variations in its gradient $\delta H/\delta u$. To this end, the device according to the invention comprises a magnetometer assembly for high-precision absolute measurements, comprising filter means for eliminating the constant component of the measured field. (If this magnetometer is installed in an aircraft, it should comprise means for compensating the affect of the magnetic parts of the aircraft and should have a system for deducing $H_{max}$ and $(\delta H/\delta u)$ max from the data supplied by the magnetometer.)

Although other magnetometer assemblies (for example optical pumping assemblies) can be used, the assembly is advantageously of the kind described and shown in our French Patent Specification No. 1,591,129 comprising an installation for automatically compensating the effect of the carrying aircraft. Here, we shall give only a brief description of the parts of the device according to the patent.

The magnetometer assembly comprises two nuclear (generally proton) magnetic resonance filters 10, 12 mounted on a tail extension. The filters are identical and aligned along the longitudinal axis of the aircraft. Filter 10 together with a loop amplifier 14 forms a magnetometer for providing absolute measurements of the total field (resulting) from the combination of the earth's field and the effect of the aircraft, which may be compared with a small magnetic dipole). The second nuclear filter 12 receives the output signal of amplifier 14 at the nuclear resonance frequency. The output signal of filter 12 is amplified at 15 and the phase shift given by filter 12 is measured by the phase-meter 16. The nuclear resonance frequency is measured by the frequency-meter 18, whose output signal is corrected by a subtractor 20 by an amount proportional to the phase-shift signal amplified at 21. A band-pass filter 22 eliminates the constant components of the field so that the perturbation H alone is recorded on a tape recorder 24.

The magnetometer assembly is associated with an installation 26 for determining the maximum value $H_{max}$ of the perturbation H and the maximum approximate value of the gradient. A sampling device 27 connected to the output of filter 22 delivers the value of H at a constant frequency. If for example the reconnaissance aircraft is flying at 360 km/h, a 0.1-second recurrence frequency can be used, corresponding to a measurement every 10 metres. The sampling device 27 shown has a digital output. It supplies a shift register 28 controlled by a clock 30 which also triggers device 27. The shift register is associated with a comparison circuit 32 which may be of conventional kind and is used for determining the maximum value $H_{max}$ of H. Circuit 32 records the maximum value of $H_{max}$ over a predetermined number of samples, starting from the instant when it receives a resetting pulse from a threshold circuit (not shown) triggered by the output of filter 22. For example, if a sample is taken every 10 metres, it is sufficient to make the selection over approx. 1000 metres, i.e., 100 samples. Owing to the use of the shift register 28, the comparison is first made on samples corresponding to a position of the aircraft at which the perturbation is below the threshold, but this feature is not essential.

The maximum value of the gradient $\delta H/\delta u$ is determined by comparing it with $\Delta H/\Delta u$, where $\Delta u$ denotes the length of a segment centred on the measuring point (FIG. 1) and $\Delta H$ denotes the difference between the field moduli at the two ends of the segment. In the preceding example, $\Delta u$ may advantageously be made equal to 20 m, although this value is in no way limitative.

The system for measuring $\Delta H/\Delta u$ comprises a subtractor 34 which gives the absolute value of the difference between samples of the field recorded in two positions of the shift register 28 separated by the position at which the perturbation H is sampled. The output of subtractor 34 is connected to a comparison circuit 36 which determines the maximum value out of those which have been supplied to it from the instant when it receives a resetting pulse from the aforementioned threshold circuit.

The outputs of comparators 32, 36 supplying the maximum values $H_{max}$ and $\Delta H_{max}$ are applied to a divider 38 comprising means for manually displaying the value of m and the constant value of $\Delta u$ (proportional to the speed) enabling the value 1 or 1/3.5 to be given to m. At the end of the sampling period (0.1 sec. in the case considered previously) a delay circuit (not shown) outputs a triggering signal which causes the divider 38 to display $z_0$. In the case of orthogonal paths, we have:

$$z_0 = 1/3.5 \cdot 3 \, H \, max/(\Delta H/\Delta u)max$$

The circuit which has been described is digital, but of course a circuit having anglog elements could equally well be used without altering its operation.

It will be understood that it is unnecessary to provide a special circuit for measuring the gradient by comparing the values of H measured at regular intervals, since the gradient is given by the magnetometer assembly in the tail of the plane. Near the aircraft, however, the gradient is due mainly to the magnetic components of the aircraft and cannot be used for calculating $z_0$.

In practice, the device for determining the depth of a submarine is used in the following manner. When the reconnaissance aircraft detects an anomaly by any method (e.g., by using magnetic or acoustic means), the device begins the "hunting-circles" search procedure shown diagrammatically in FIG. 6 (circles at an inclination of 30° at a speed of approx. 180 knots). The aircraft begins a circular trajectory 40 centred on the position of the anomaly at the instant of contact. Since the speed of the aircraft (e.g., 180 knots) is much greater than that of the submarine (approx. 20 knots), the submarine will intersect the path of the aircraft at right angles if the submarine continues to travel in a constant direction 42. In that case, even if there is a slight shift in the plane, the aircraft will record an even curve on recorder 24, thus showing that the conditions are fulfilled under which formula (1) is valid. Consequently the distance $z_0$ will appear on the divider 38 and the depth of the submarine can be determined by subtracting the altitude of the aircraft from $z_0$ — an operation which can be performed automatically by connecting the divider 38 to a subtractor having an input 44 (FIG. 5) supplied by the altimeter. If the submarine changes direction (the trajectory shown at 46 on FIG. 6), the absence of orthogonality will be shown in the recording of the field H, which will immediately have a preponderance of uneven terms. The trajectory of the aircraft should then be corrected so that it corresponds to new hunting circles centred on the new detection point.

The aforementioned method may be unsuitable in some cases, either when the submarine is travelling substantially east or west, or when the anomaly is stationary (as in FIG. 7). If the submaring is travelling east or west, the magnetic signal observed by a plane flying in a northerly direction is very weak and would even be zero if the submarine were completely similar to a simple horizontal dipole. In such cases, the device on the reconnaissance aircraft searches for the main direction of the anomaly by movements during which it makes use of the field and gradient measurements. When the aircraft is perpendicularly above the dipole, the curve showing variations in the gradient is uneven (as in FIG. 8 when the aircraft is flying 300 m above the submarine). On the other hand, when the aircraft flies parallel to the submarine, the field curve mainly contains uneven terms whereas the gradient curve mainly contains even terms. In FIG. 9, where the dipole is in the east-west direction, the field curve is actually uneven whereas the gradient curve is even. In this case also, there is no signal from the horizontal dipole when the aircraft passes over it at right angles.

When the main directions of the dipole have been found, the device causes the aircraft to travel along a 4-leaved clover trajectory 47 during which it passes substantially perpendicularly over the dipole, parallel to its main direction 50. At each run, the depth is automatically measured by the device in FIG. 5, m being alternately made equal to 1/3.5 and 1.

We claim:

1. A method of determining the depth $z_0$ below a device for measuring the total magnetic field, of a magnetic anomaly at least approximately comparable with a horizontal dipole, steps of measuring the variation in the perturbation H to the magnetic field caused by the anomaly and the variation in the gradient $\delta H/\delta u$ along a horizontal path perpendicular to a main direction of the dipole, and deducing the depth $z_0$ from the formula:

$$z_O = 3.m\, H\max / (\delta H/\delta u)\max.$$

wherein $H_{max}$ denotes the maximum value of the perturbation H in the field and $(\delta H/\delta u)$ max denotes the maximum value of the gradient on the path followed, and wherein $m$ is equal to 1/3.5 if the path is perpendicular to the dipole and is equal to 1 if the path is parallel thereto.

2. A method according to claim 1 of determining the depth $z_0$ of a submerged magnetic anomaly which can move in the main direction of the dipole, including the step of measuring the variation and the gradient along a circular path centered at the position of origin of the anomaly and at a speed much higher than that of the anomaly.

3. A method according to claim 1 of determining the depth $z_0$ of a static submerged magnetic anomaly, including the step of measuring the variation and the gradient along a four-leaved clover path centered on the anomaly over the anomaly along the two main directions of the dipole.

4. A method according to claim 1 wherein the gradient is measured by subtracting fields measured at regular intervals of time, using a magnetometer moving along the path.

5. A device for determining the depth $z_0$ of a magnetic anomaly at least approximately comparable with a horizontal dipole comprising on a vehicle which can fly at constant altitude, magnetometer means for measuring the total earth's magnetic field, filter means electrically connected to said magnetometer means eliminating the constant components of the magnetic field and showing the perturbation produced by the anomaly, means for measuring the gradient $\delta H/\delta u$ along the path followed by the vehicle electrically connnected to said filter means, and means electrically connected to said filter means for recording the maximum values $H_{max}$ and $(\delta H/\delta u)$ max and calculating the depth by the formula:

$$z_O = 3m.\, H \max/(\delta H/\delta u) \max$$

wherein $H_{max}$ is the maximum value of the perturbation H in the field, $m$ is equal to 1/3.5 when the path of the aircraft is perpendicular to the dipole and to 1 when the two directions are parallel.

6. A device according to claim 5, the gradient-measuring means including means which automatically show the absolute difference between the field values or the perturbation values at instants separated by equal intervals of time.

7. A device according to claim 5 including means, associated with the filter, for sampling the perturbation H at equal time intervals.

8. A device according to claim 7, including a circuit for comparing successive samples of the perturbation H giving the maximum value $H_{max}$ of the perturbation.

9. A device according to claim 7, including means for automatically showing the difference $\Delta H$ between successive samples of the perturbation H and a comparator supplying the maximum value $\Delta H_{max}$ of $\Delta H$.

10. A device according to claim 7, including a shift register supplied by the sampling device.

* * * * *